March 10, 1959  J. B. ANINGA ET AL  2,876,889
TRANSPORT DEVICE FOR ELONGATED OBJECTS
Filed Oct. 5, 1954  2 Sheets-Sheet 1

INVENTORS
JOHANNES BERNARD ANINGA
JAN TENGER
BY
AGENT

March 10, 1959     J. B. ANINGA ET AL     2,876,889
TRANSPORT DEVICE FOR ELONGATED OBJECTS
Filed Oct. 5, 1954     2 Sheets-Sheet 2
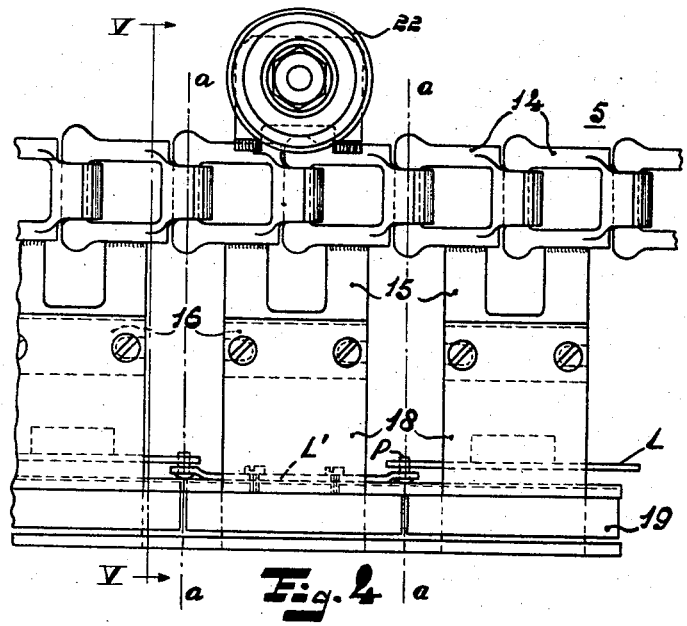
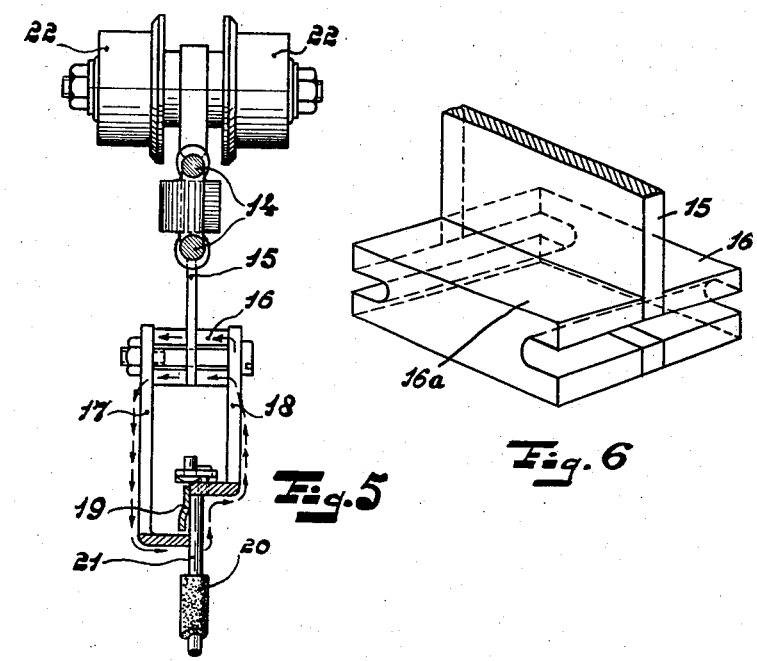
INVENTORS
JOHANNES BERNARD ANINGA
JAN TENGER
BY 
AGENT

United States Patent Office 2,876,889
Patented Mar. 10, 1959

2,876,889

TRANSPORT DEVICE FOR ELONGATED OBJECTS

Johannes Bernard Aninga and Jan Tenger, Eindhoven, Netherlands, assignors, by mesne assignments, to North American Philips Company, Inc., New York, N. Y., a corporation of Delaware Application October 5, 1954, Serial No. 460,364

Claims priority, application Netherlands October 10, 1953

5 Claims. (Cl. 198—41)

The present invention relates to a transport device. More particularly, the invention relates to a transport device for conveying in a vertical position of suspension elongated objects having a longitudinal ferromagnetic core. Such a transport device may be used with furnaces, for example for drying the coating of welding rods. The coating of such rods is very vulnerable so that it is desirable to suspend a rod in a manner such that it cannot be damaged. A rod could be secured to a transport device by means of a clamping member, but it generally takes a relatively long time to open and close such clamping members.

This invention relates to a transport device to which the objects can be secured and from which they can be removed in a simple and rapid manner. The transport device of the invention has the feature that it comprises one or more displaceable magnets, each of the objects being suspended at one end on the magnet in a manner such that at the other end of the object no potential difference prevails between this object and an adjacent second ferromagnetic object. The second ferromagnetic object may be, for example a welding rod, to be conveyed or a ferromagnetic wall along which the objects are conveyed. The objects are then suspended on the transport device in a manner such that a magnetic circuit is formed between a magnet and a top part of an object.

In a structurally simple embodiment of the invention the ferromagnetic core of the object constitutes a bridge between the two poles of the magnet.

According to another feature of the invention, the top side of the object is in contact with one pole of the magnet, the side of the object being in contact with the other pole of the magnet. Although in the embodiment of the invention the top part of a ferromagnetic object together with a magnet constitutes a closed magnetic circuit, so that as a matter of fact no potential difference can occur between the free ends of two adjacent objects, there could be produced a potential difference between an object and an adjacent wall via the transport device. Therefore, in accordance with still another feature of the invention, the magnets are secured to the conveyor in a manner such that at the free ends of the ferromagnetic objects no potential difference prevails between these objects and a ferromagnetic wall. This may for example be achieved by means of a magnetically insulated connection of the magnets to the conveyor.

However, in another embodiment of the invention, the magnets may have a horizontal direction of magnetization, which is at right angles to the direction of movement of the magnets, while a magnet is secured to a conveyor in the center between the North pole and the South pole of the magnet.

The transport device according to the invention may, as stated above, be used successfully in a furnace intended for drying welding rods, since it is of prime importance in such a case that the objects be secured in a simple manner to the transport device without being damaged. However, the transport device may be advantageously utilized in other instances, such as, for example, for conveying metal objects painted wholly or partly.

In order that the invention may be readily carried into effect, it will now be described with reference to the accompanying drawing, wherein:

Fig. 4 is an enlarged lateral view of the conveyor portion which may be utilized in the furnace of Fig. 1;

Fig. 5 is a cross sectional view taken on the line V—V of Fig. 4; and

Fig. 6 is an enlarged perspective view of the magnet portion which may be utilized in the furnace of Fig. 1.

Figure 1:
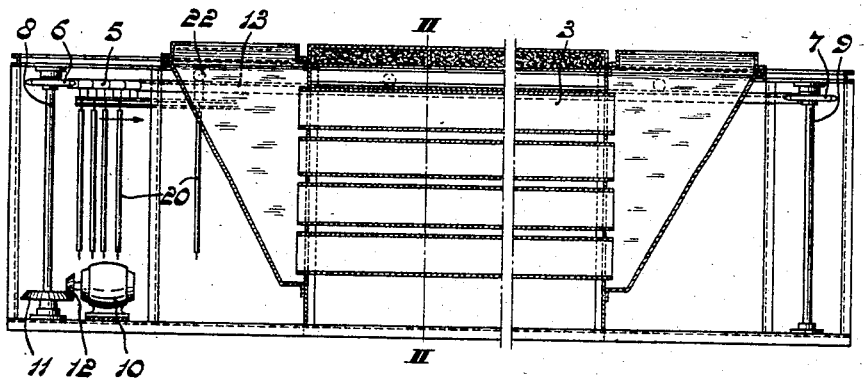
Fig. 1 is an embodiment of a longitudinal sectional view of a furnace for drying welding rods.

The furnace for drying the welding rods is provided with two iron walls 1 and 2, between which the rods to be dried are conveyed in a vertical position of suspension. The walls 1 and 2 are heated, for example by means of steam traversing the spaces 3 and 4, the boundaries of which are formed by the walls 1 and 2, respectively. On the top side of the furnace provision is made of a transport device constituted by an endless chain. The chain is propagated by means of the gears 6 and 7, seated on the vertical shafts 8 and 9 respectively. The shaft 8 is driven by the motor 10 and the bevel gears 11 and 12. The transport chain 5 and the associated suspension means for the welding rods will be described hereinafter with referenec to Figs. 4 and 5.

The furnace is provided with rails 13, by means of which the transport chain is supported. The welding rods to be dried are suspended on the left-hand side of the furnace from the transport device and are then propagated between the walls 1 and 2, the rods thus being dried. On the right-hand side of the furnace the rods may be removed from the transport device.

Figure 2:
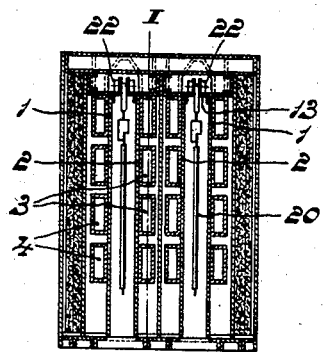
Fig. 2 is a cross sectional view taken on the line II—II of Fig. 1.
Figure 3:
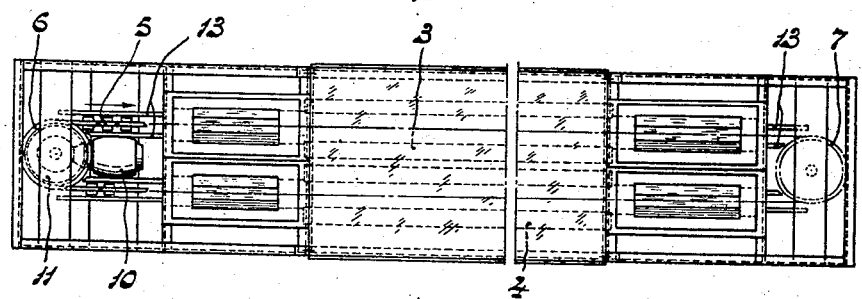
Fig. 3 is a plan view of the embodiment of the furnace of Fig. 1.

Figs. 4, 5 and 6 show on an exaggerated scale the transport chain and the suspension device. The transport chain 5 comprises links 14, which are secured pairwise to one another by means of metal plates 15. To each plate 15 is secured a magnetic suspension device, which is constituted by a permanent magnet 16 having a horizontal direction of magnetization, or flux, and pole shoes 17 and 18. The direction of magnetization is at right angles to the direction of movement of the magnets and is shown in Fig. 5 by arrows. The links L and L' connect the upper poles of the magnet and pivot about point P; the pivot axis of point P coinciding with the pivot axis a—a of the chain links 14. In Fig. 5 this direction of movement is at right angles to the plane of the drawing. The plate 15 is secured to the magnet in the center between the pole shoes 17 and 18. A supporting plate 19 is secured to the pole shoe 18. The supporting plate 19 facilitates the attainment of the correct suspension of the welding rod. The welding rod 20 is suspended in the device with its polished end, so that the ferromagnetic core 21 constitutes a bridge between the poles 17 and 18 of the magnet. Due to the suspension of the welding rod 20 there is no potential difference between the lower end of the welding rod and the ferromagnetic walls 1 and 2, along which the welding rods are transported or between two adjacent welding rods. Thus the rods are always conveyed in a vertical position of suspension. Consequently, the rods do not tend to repel one another or to adhere to the ferromagnetic walls 1 or 2. Thus, the chain 14 is moved between guide rollers 22 which run over rails 13 (Fig. 2). The magnets 16 are connected to the strip 15, the strip being welded to two segments of the chain. The plate 19 may be secured by screws or otherwise fixed to the poles 18. It should be noted, therefore, that the upper portion of each welding rod rests against the poles 17 and 18.

In the embodiment described above the top side of the object is in contact with the pole 18, its lateral side being in contact with the pole 17. Of course, the poles may be shaped in a different form. The two poles may, for example, be in contact each with one side of the object. Moreover, instead of using permanent magnets, use may be made of electromagnets. In this case, interruption of the current permits the automatic removal of the objects from the suspension device. In order to support the chain 5 provision is made locally of guide rollers 22, which travel along the rails 13.

Fig. 6, which is an enlarged perspective view of the magnetic portion which may be utilized in the furnace of Fig. 1, illustrates an embodiment of a magnet device. In the embodiment of Fig. 6 the magnetic blocks 16 and 16a are welded to the plate 15, which in turn is welded to the links 14 of the chain. The parts 15, 16 and 16a may, of course, be integral in form.

While the invention has been described by means of a specific example and in a specific embodiment, we do not wish to be limited thereto, for obvious modifications will occur to those skilled in the art without departing from the spirit and scope of the invention.

What is claimed is:

1. A device for transporting vertically suspended welding rods each having a longitudinal ferromagnetic core comprising conveying means, at least one magnet secured to said conveying means, said magnet being provided with two spaced poles, at least one of said welding rods bridging said poles and being suspended at one end to said magnet whereby at the other end of said welding rod there is no potential difference between said welding rod and an adjacent welding rod, and an abutment element affixed to one of said poles for engaging said one end of said welding rod.

2. A device for transporting vertically suspended welding rods each having a longitudinal ferromagnetic core, comprising conveying means, at least one magnet secured to said conveying means, said magnet being provided with two spaced poles, at least one of said welding rods bridging said poles and being suspended at one end to said magnet whereby at the other end of said welding rod there is no potential difference between said welding rod and an adjacent welding rod, and an abutment element affixed to one of said poles and engaging one end of said welding rod, the top surface of each of said welding rods being engaged by one pole of an associated magnet and a side surface of each of said welding rods engaged by the other pole of said associated magnet, said one pole being arranged at a higher level than said other pole.

3. A device for transporting vertically suspended welding rods each having a longitudinal ferromagnetic core, comprising an enclosure for said device, at least one ferromagnetic wall positioned in said enclosure, conveying means, at least one magnet secured to said conveying means, said magnet being provided with two spaced poles, at least one of said welding rods bridging said poles and being suspended at one end to said magnet whereby at the other end of said welding rod there is no potential difference between said welding rod and an adjacent welding rod and between said welding rods and said ferromagnetic wall, and an abutment element affixed to one of said poles and engaging one end of said welding rod.

4. A device for transporting vertically suspended welding rods each having a longitudinal ferromagnetic core, comprising an enclosure for said device, at least one ferromagnetic wall positioned in said enclosure, conveying means, at least one magnet secured to said conveying means, said magnet being provided with two spaced poles, at least one of said welding rods bridging said poles and being suspended at one end to said magnet whereby at the other end of said welding rod there is no potential difference between said welding rod and an adjacent welding rod and between said welding rods and said ferromagnetic wall, and an abutment element affixed to one of said poles and engaging one end of said welding rod, said magnet being secured to said conveying means at a point between said poles and having a horizontal direction of magnetization which is at right angles to the direction of movement of the said magnet.

5. A device for transporting vertically suspended welding rods each having a longitudinal ferromagnetic core, comprising conveying means, at least one magnet secured to said conveying means, said magnet being provided with two spaced poles, at least one of said welding rods bridging said poles and being suspended at one end to said magnet whereby at the other end of said welding rod there is no potential difference between said welding rod and an adjacent welding rod, and an abutment element affixed to one of said poles and engaging a side surface of said welding rod, the top surface of each of said welding rods being engaged by one pole of an associated magnet and a side surface of each of said welding rods engaged by the other pole of said associated magnet, said one pole being arranged at a higher level than said other pole.

References Cited in the file of this patent

UNITED STATES PATENTS

| | | |
|---|---|---|
| 2,267,510 | Swihart et al. | Dec. 23, 1941 |
| 2,490,289 | Williams | Dec. 6, 1949 |
| 2,526,253 | Merrill | Oct. 17, 1950 |
| 2,609,915 | De Burgh | Sept. 9, 1952 |